J. M. HADESTY.
Devices for Tapping Mains.

No. 150,414.                    Patented May 5, 1874.

Witnesses.
Howard L. Williams
A. H. Dreibelbis

Inventor
J. M. Hadesty

UNITED STATES PATENT OFFICE.

JAMES M. HADESTY, OF TAMAQUA, PENNSYLVANIA.

IMPROVEMENT IN DEVICES FOR TAPPING MAINS.

Specification forming part of Letters Patent No. 150,414, dated May 5, 1874; application filed June 14, 1873.

*To all whom it may concern:*

Be it known that I, JAMES M. HADESTY, of Tamaqua, Schuylkill county, State of Pennsylvania, have invented an Improvement in Machines for Tapping Water-Mains, of which the following is a specification:

My invention relates to that class of devices intended for use in tapping water-pipes while under pressure of the water; and it consists in the combination, with a divided holder and a support for clamping it on the pipe, of two divided rubber packings, one resting on the pipe and the other contained within the divided holder or clamp, that forms a water-tight joint at the points of contact between the two halves, and a valve arranged within the holder for stopping the flow of water upon the withdrawal of the drill.

Figure 1:
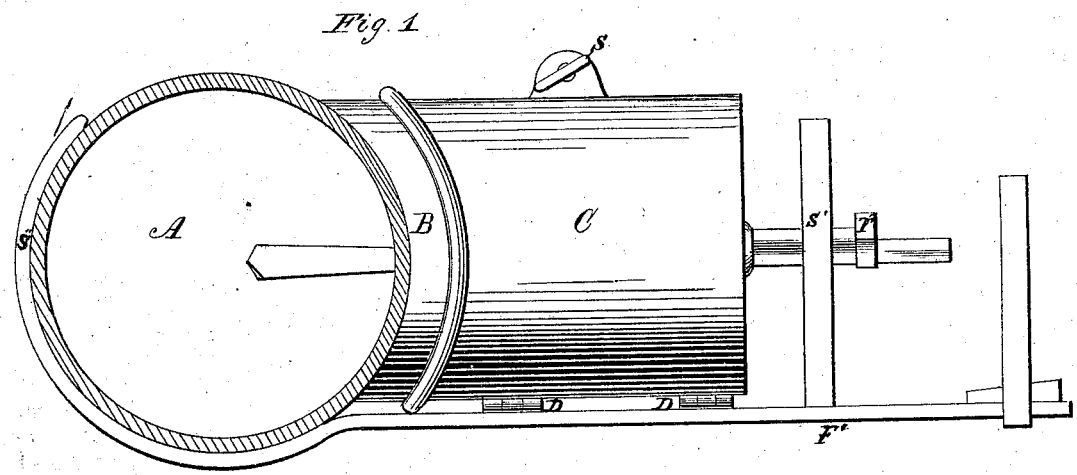
Figure 4:
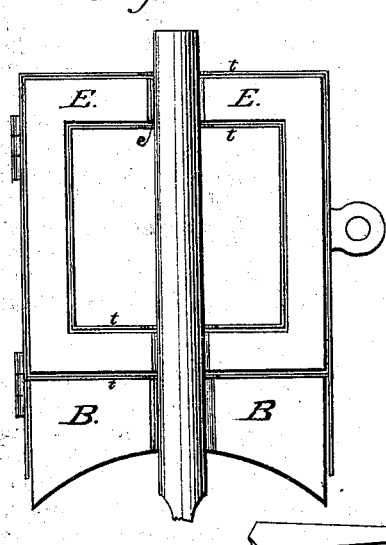
Figure 2:
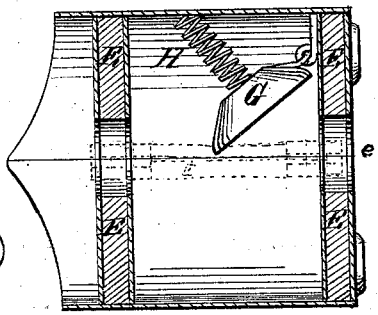
Figure 3:
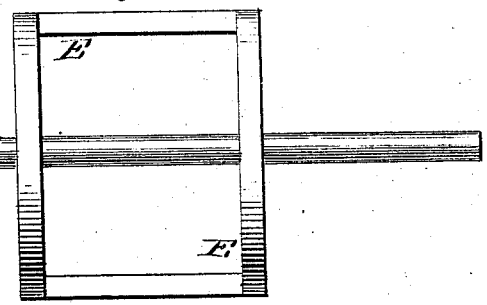

In the drawing, Figure 1 represents a side view of my improved device; Fig. 2, a longitudinal section; Fig. 3, the form of the rubber packing, and Fig. 4 an inside view of one of the sections of the holder.

C is a hollow cylinder or holder, divided longitudinally, hinged at D D, and fastened together by a screw, S, passing through lugs formed on the two parts. E is a rubber packing set in a recess, and extending around the edges of each of the sections. The plates *t t* at the ends of the half cylinders or sections form a recess, extending the full width of the holder, and into this the packing extends. Within the holder is arranged a valve, G, for closing the opening through which the drill is entered by the pressure of the water from within when the drill is removed. A spring, H, prevents the valve falling too far back to be acted upon by the water. The cylinder C has a hollow recess at its lower end, and in which a divided packing, B B, is placed. The cylinder is held firmly in position on the pipe A by a standard, F', provided with a claw, S'', extending under the pipe A, and having a bifurcated arm, S', through the hanches of which work screws T', that bear upon the upper surface of the cylinder, and press it and the packing tightly on the pipe. The drill is introduced through openings E E, made partly in the two sections of the holder. A suitable ratchet brace or handle is applied to the upper end of the drill to operate it, the feed being applied in the usual manner. After the hole has been drilled the feed-screw is run back, and upon the withdrawal of the drill the force of the water immediately closes the valve and prevents further escape. The pipe to be inserted is then pushed in, pressing back the valve, and is screwed into position, after which the screws are released, and the two sections of the cylinder opened and taken off from around the pipe. The washer B is in like manner removed.

I claim—

In combination with the clamp C, hinged at D, and fastened at S, as described, the elastic packing E, extending around the openings through which the drill passes, and along the faces of the holder at their points of contact, the divided packing B, valve G, and support F', having arms S' and set-screws T', as and for the purpose set forth.

J. M. HADESTY.

Witnesses:
 HOWARD L. WILLIAMS,
 A. H. DUIBELBIS.